F. CLARK.
CRANK WHEEL.
APPLICATION FILED DEC. 23, 1914.
1,149,029.
Patented Aug. 3, 1915.
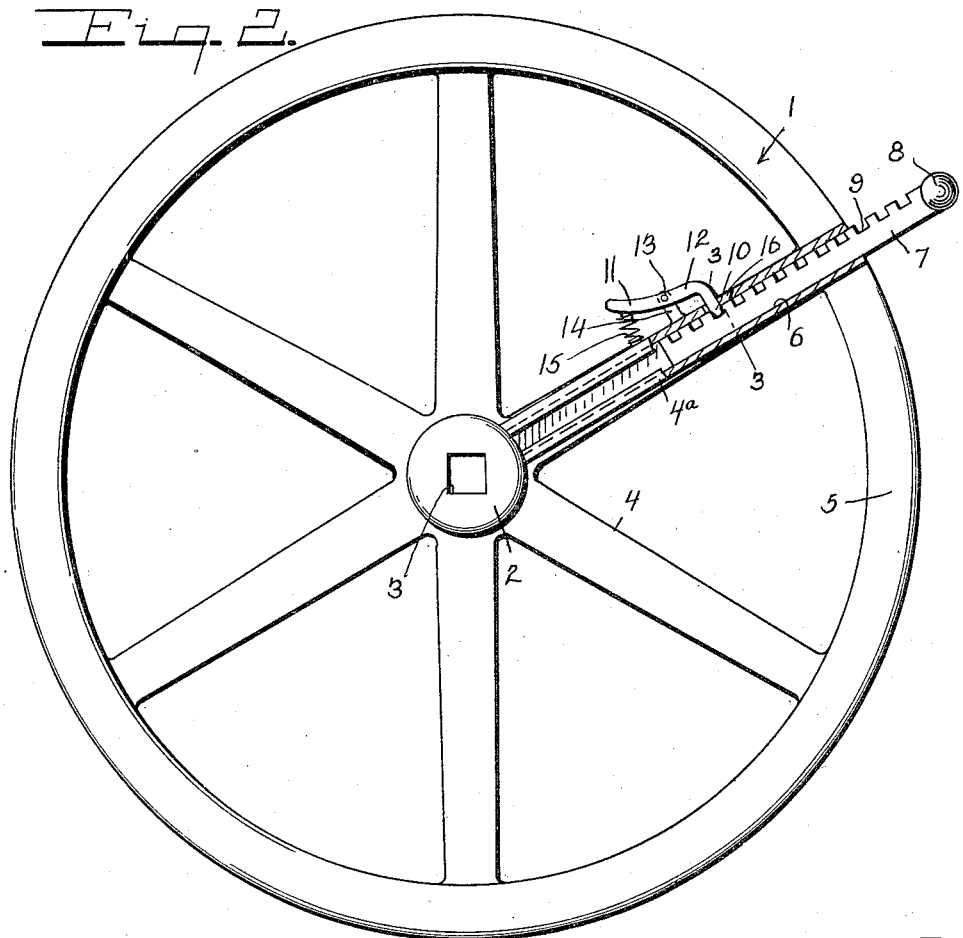
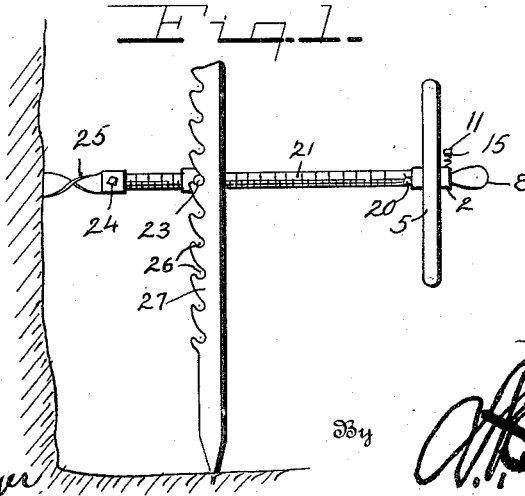
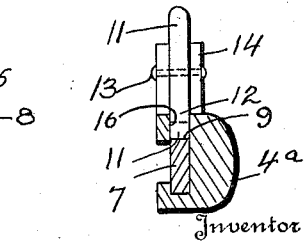
Inventor
F. Clark

UNITED STATES PATENT OFFICE.

FRANK CLARK, OF SCRANTON, PENNSYLVANIA.

CRANK-WHEEL.

1,149,029.  Specification of Letters Patent.  Patented Aug. 3, 1915.

Application filed December 23, 1914. Serial No. 873,756.

*To all whom it may concern:*

Be it known that I, FRANK CLARK, a subject of the King of Great Britain, residing at Scranton, in the county of Lackawanna and State of Pennsylvania, have invented certain new and useful Improvements in Crank-Wheels; and I do hereby declare the following to be a full, clear, and exact description of the invention, such as will enable others skilled in the art to which it appertains to make and use the same.

This invention relates to crank wheels, and the primary object of the invention is to provide a wheel of this nature which has the crank handle adjustably supported thereby for radial adjustment to or from the central axis of the wheel for increasing the leverage scope thereof and to provide a wheel of this nature which is particularly adapted for attachment to mining drills for boring blast holes.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a view showing the application of the improved power wheel. Fig. 2 is a plan view of the wheel, and Fig. 3 is a sectional view on the line 3—3 of Fig. 2.

Referring more particularly to the drawings, 1 designates the crank wheel structure which is of the ordinary type, having a hub 2 which is provided with a rectangular opening 3 formed therein and spokes 4 radiating from the hub and connected to the rim 5 of the wheel.

One of the spokes 4 which will be designated as the spoke 4ª is provided with a bore 6 formed therein, in which is slidably seated a bar 7 which has a handle 8 secured to its outer end. The handle 8 extends upwardly from the bar 7 and is provided for the manual rotation of the wheel 1.

The bar 7 is provided with a plurality of serrations 9 formed in one edge thereof, which are adapted for receiving the inner end 10 of a spring catch 11. The spring catch 11 constitutes a bar 12 which is bent to form the inserting end 10, and which is pivotally mounted intermediate its ends upon a pin 13. The pin 13 is supported by arms 14 formed upon the spoke 4ª. The spiral spring 15 is secured to the spoke 4ª and to the upper end of the bar 12, tending to force the inserting end 10 through the opening 16 which is formed in the side of the spoke 4ª and into any one of the serrations 9 for holding the bar 7 in various adjusted positions. The longitudinal adjustment of the bar 7 within the bore 6 of the spoke 4ª will permit of the adjustment of the handle 8 radially of the central axis of the wheel.

In the application of the improved wheel, the upper rectangular end 20 of a boring bit 21, such as is ordinarily used in drilling blast holes in mines is seated in the rectangular hub opening 3. The shank 21 of the drill bit is externally screw threaded and has a nut 22 mounted thereupon, which has a transversely extending pin 23 carried thereby. The lower end of the shank 21 has an ordinary type of bit receiving collar 24 secured thereto, to which is attached a bit 25 as the ordinary type used for drilling blast holes. The transversely extending pin 23 is adapted for seating any one of the serrations 26 which are formed in a bar 27.

In drilling a blast hole in a mine, the bar 27 is rigidly connected to the mine wall, and the pin 23 is seated in any one of the serrations 26, which prevent the collar 22 from rotation and the bar 7 is adjusted for properly positioning the handle for the most efficient operation of the wheel. After the handle 8 has been properly adjusted rotation is imparted to the shank 21 and the bit 25 carried thereby by manually rotating the wheel 1, feeding the shank 21 downwardly through the collar 22 and boring a blast hole in the mine wall.

In reducing the invention to practice certain minor features of construction, combination and arrangement of parts may necessitate alterations to which the patentee is entitled provided such alterations are comprehended within the scope of what is claimed.

What is claimed is:—

In a crank wheel the combination of a spoke having a radial bore, a bar adjustably and slidably seated within the bore, said bar provided with serrations formed in the upper edge thereof, a handle secured to one end of said bar, and extending at right angles therefrom for adjusting the same, arms formed integrally with the spoke and extending upwardly at right angles therefrom, a catch pivotally mounted intermediate its ends and carried by said arms and adapted for seating in the serrated portion of said bar.

In testimony whereof I affix my signature in presence of two witnesses.

FRANK CLARK.

Witnesses:
 ROGER W. EDWARDS,
 FRED C. FABRETTI.

Copies of this patent may be obtained for five cents each, by addressing the "Commissioner of Patents, Washington, D. C."